March 7, 1933.   G. A. AYLSWORTH   1,900,856
REFRIGERATOR CONSTRUCTION
Filed April 9, 1931
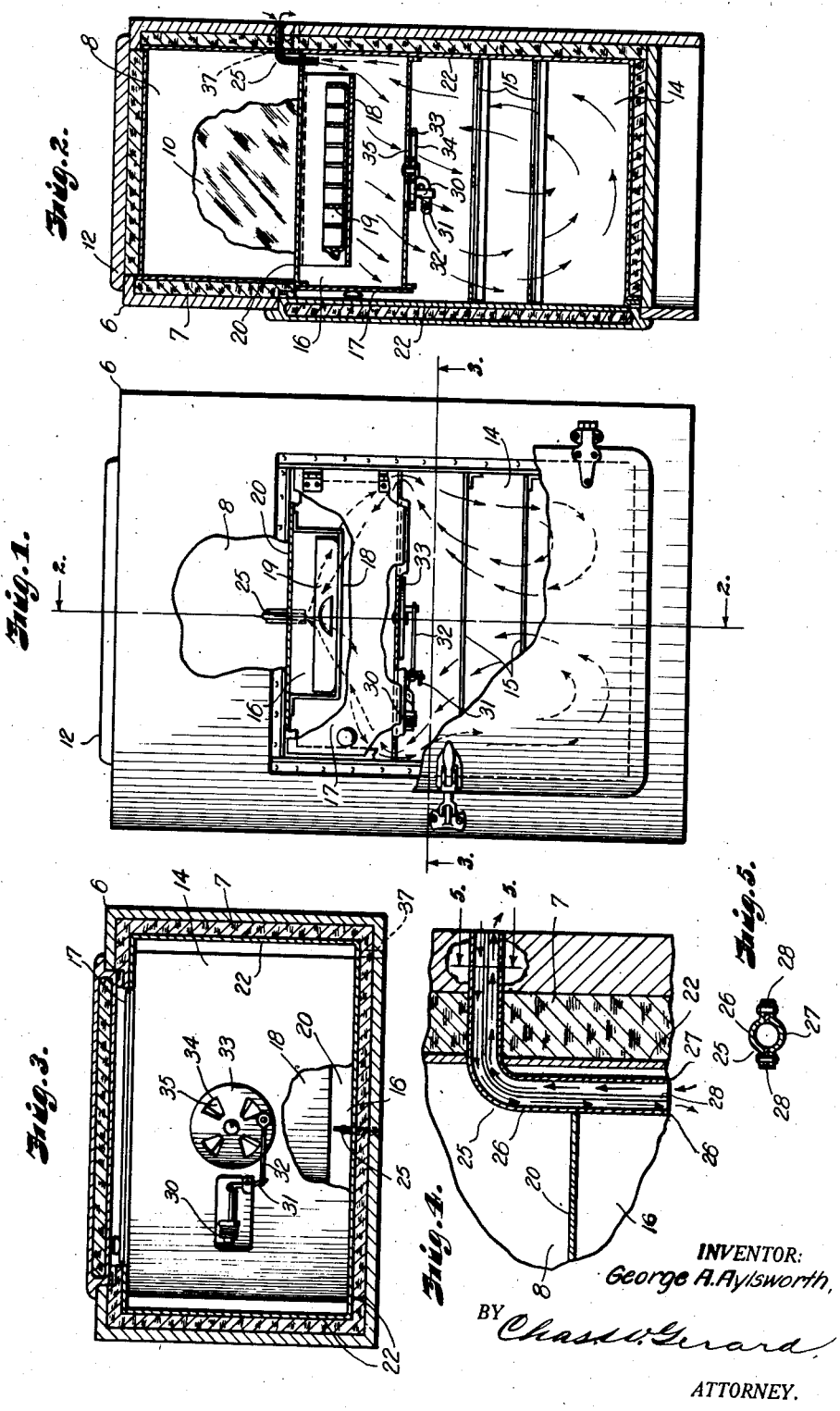
INVENTOR:
George A. Aylsworth,
BY Chas. V. Gerard
ATTORNEY.

Patented Mar. 7, 1933

1,900,856

UNITED STATES PATENT OFFICE

GEORGE A. AYLSWORTH, OF KANSAS CITY, MISSOURI, ASSIGNOR TO COLD CONTROL CORPORATION, OF KANSAS CITY, MISSOURI, A CORPORATION OF MISSOURI

REFRIGERATOR CONSTRUCTION

Application filed April 9, 1931. Serial No. 528,877.

The present invention relates to refrigerating apparatus, and has for its primary object to devise a refrigerating cabinet particularly adapted for the use of solid carbon dioxide, or the product known commercially as dry ice, as the refrigerating agent, and accordingly, the principal object of the present invention is to provide a cabinet structure whereby the refrigerating action may be efficiently produced without making any particular effort to control the movement or circulation of the gas generated from the solid $CO_2$, but by an indirect conduction method combined with an appropriate control of the air movement within the refrigerating chamber whereby the heat exchange function is carried out by connection within said chamber.

As one method of effecting the required heat exchange function, it is proposed to use metallic surfaces exposed to the interior of the storage compartment and in heat conducting relation to the walls or floor of the dry ice compartment, the material selected for forming the exposed surfaces being one having a sufficiently high specific thermal conductivity for effecting a correspondingly rapid rate of heat exchange, as required for efficiently carrying out the refrigerating action.

As a means for promoting the air circulation within the refrigerating chamber, there is provided a passage communicating with the outside atmosphere and of such a construction as to induce counter currents of air within the passage by means of surfaces maintained at different thermal states.

In the illustrated embodiment of the invention, there is also provided a thermostatic control, for regulating the rate of movement of air within the refrigerating or storage chamber, whereby the condition of the storage compartment is automatically maintained at an even and uniform temperature so far as is possible by means of such regulation of the air circulation.

With the foregoing general objects in view, the invention will now be described by reference to the accompanying drawing illustrating one suitable and practical embodiment of the proposed improvements, in cabinet form, after which those features and combinations deemed to be novel will be particularly set forth and claimed.

In the drawing—

Figure 1 is a front elevation, with portions broken away to disclose the interior, illustrating a refrigerating cabinet constructed in accordance with the present invention;

Figure 2 is a vertical sectional view, representing a section taken on the line 2—2 of Figure 1;

Figure 3 is a horizontal section, representing a section taken on the line 3—3 of Figure 1;

Figure 4 is an enlarged sectional detail showing the thermal or heat differential passage for air circulation purposes; and Figure 5 is a section on the line 5—5 of Figure 4.

Referring now to the drawing in detail, this illustrates the improved construction as embodied in a refrigerator cabinet 6, all walls of which are suitably insulated as indicated at 7, and the interior of which is constructed to provide an upper refrigerant chamber 8 for receiving the block 10 of the refrigerant, such as solid carbon dioxide, access to the chamber 8 being provided by means of the removable top or cover member 12.

Below the chamber 8, the cabinet 6 is provided with the usual storage compartment 14 reached by way of an insulated door 9 and containing the shelves or trays 15 as well as a freezing chamber 16 provided with a hinged door 17. Within the chamber 16 is provided a shelf 18 for supporting a tray 19 for the freezing of water ice cubes, the shelf 18 being attached directly to the under face of the metallic floor 20 of the dry ice chamber 8.

In the present improved construction, the heat exchange is not carried out by any control of the movement or circulation of the $CO_2$ gas as generated by the melting of the block of ice 10, but indirectly by conduction of the heat from the floor and walls of the chamber 8, for which purpose the walls 22 of the lower refrigerating or storage chamber 14 are formed as continuations of the metallic walls of the chamber 8, or if desired, may be of different metallic heat-conductive materials secured in heat-conducting relation to said walls of the chamber 8. As nearly all metals are possessed of good heat-conductive properties, practically any of them may be employed for this purpose, although I find aluminum especially suitable for forming the walls 22, since it is not only possessed of high specific thermal conductivity, but is light and not easily corroded and may also be easily cleaned and kept in a sanitary condition.

The refrigerating action may be further promoted by proper acceleration of the air circulation within the storage or refrigerating chamber 14 and thus promoting the final stage of the heat-exchange function by convection, in which connection it is also possible to effect an efficient control of the refrigerating action by regulation of this air movement.

One novel feature of the construction, therefore, consists in the provision of an air circulating tube 25 which, as illustrated in Figure 4, is constructed of two different metallic substances, such as aluminum 26 and iron 27, varying as to specific thermal conductivity, and separated by suitable insulation 28 (such as cardboard or the like), this tubular device 25 being arranged at the top of the refrigerator compartment, extending through the floor 20 and out through the rear wall of the cabinet 6. The tubular device 25 is thus exposed to a range of different temperatures, and in view of the relatively different thermal conductivities of the different metals 26 and 27, the corresponding interior surfaces of the passage through the tube are maintained at appreciably different temperatures, with a result that since the inner end portion of the tube is for the most part in vertical position, air currents are set up in opposite directions, for replacing the air in the refrigerating compartment, as indicated by the arrows in Figures 2 and 4. This air circulation is of course not only useful for promoting the heat exchange function by convection across the chilled walls forming the interior walls of said compartment, but also promotes a more wholesome condition of the air in the storage compartment by keeping it fresh, maintaining its humidity and removing disagreeable odors therefrom.

For automatically regulating the movement of the air in response to changes in temperature, it is also proposed to provide a thermostatic element 30 operatively connected with a lever arm 31, which is in turn connected by a link 32 with a shutter form of damper 33 having the openings 34 adapted to be brought into more or less registered relation with similar openings 35 in the floor of the freezing compartment 16 (see Figure 3). By the operation of this construction it is apparent that the thermostat device 30 may be so adjusted as to respond to temperature changes calling for either an opening or closing movement of the damper 33, for correspondingly increasing or decreasing the rate or extent of air circulation, as required for maintaining the temperature conditions uniform.

In the operation of a cabinet construction having the improved features illustrated herein, it will be apparent that the melting or sublimation of the refrigerant 10, as it generates the $CO_2$ gas, will take place in response to heat conducted from the refrigerated compartment 14, which will readily flow by way of the conducting elements comprising the walls 22 which are in heat-conducting relation to the floor and walls of the upper dry ice compartment 8. The refrigerant 10 is allowed to "melt" in substantially the same manner as ordinary water ice, and the resultant $CO_2$ gas permitted to escape in any desired manner, as by way of an outlet 37. Of course, if desired, the block 10 of the dry ice may be protected by insulative wrappings to some extent, if it should be desired to retard the refrigerating action by such well-known expedient. As the heat is conducted through the walls 22, the refrigerating action takes place within the compartment 14 by circulation of the air therein, bringing the air in contact with the interior surfaces of said walls 22 and effecting the transfer of heat by convection. The circulation of the air is promoted by the action of the air passage 25 in the manner above explained, and the circulating movement of the air automatically regulated by the operation of the thermostat device 30 automatically controlling the damper member or shutter 33. While the opening of the doors 9 and 17 may temporarily disturb or interrupt the refrigerating action, by raising the temperature within the refrigerating compartment, as in ordinary ice boxes, this rise in temperature will be rapidly overcome by the rapid transfer of heat through the conducting means herein provided, which will be accelerated by the action of the thermostat device in increasing the rate of air circulation, so that the desired low temperature will in a brief time be restored.

While the foregoing illustrates what is now regarded as the preferred mode of practicing the invention and type of construction for its embodiment, I desire to be understood as reserving the right to make whatever changes or modifications may fairly fall within the scope of the appended claims.

What I claim is:

1. A refrigerator construction comprising a cabinet having a refrigerant chamber and a noncommunicating refrigerating compartment, and means providing a single passage for the inflow and outflow of air from the exterior of the cabinet to and from the refrigerating compartment, said passage being exposed to the chilling action of said refrigerant chamber.

2. A refrigerator construction comprising a cabinet having a refrigerant chamber and a noncommunicating refrigerating compartment, and a tubular element composed of materials of different thermal conductivities and providing a single passage for the inflow and outflow of air from the exterior of the cabinet to and from the refrigerating compartment.

3. A refrigerator construction comprising a cabinet having a refrigerant chamber and a noncommunicating refrigerating compartment, and a tubular element composed of materials of different thermal conductivities exposed to the chilling effect of said refrigerant chamber and providing a single passage for the inflow and outflow of air from the exterior of the cabinet to and from the refrigerating compartment.

4. A refrigerator construction comprising a cabinet having a refrigerant chamber and a noncommunicating refrigerating compartment provided with a freezing compartment separated by a metallic partition from said refrigerant chamber, a tubular element composed of materials of different thermal conductivities and providing a single passage for the inflow and outflow of air from the exterior of the cabinet to and from the freezing compartment, and thermostat-controlled means for regulating the circulation of air between said freezing compartment and the remainder of said refrigerating compartment.

5. A refrigerator construction comprising a cabinet having a refrigerant chamber and a noncommunicating refrigerating compartment, a tubular element composed of materials of different thermal conductivities and providing a single passage for the inflow and outflow of air from the exterior of the cabinet to and from the refrigerating compartment, and heat insulating means separating the different materials of said tubular element.

In witness whereof I hereunto affix my signature.

GEORGE A. AYLSWORTH.